United States Patent
Lee et al.

(10) Patent No.: US 10,733,818 B2
(45) Date of Patent: Aug. 4, 2020

(54) VEHICLE, CONTROL METHOD THEREOF, AND TRANSCEIVER FOR VEHICLE

(71) Applicants: Hyundai Motor Company, Seoul (KR); Kia Motors Corporation, Seoul (KR)

(72) Inventors: Sang Heun Lee, Seoul (KR); Dongjin Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/210,235

(22) Filed: Dec. 5, 2018

(65) Prior Publication Data

US 2020/0082654 A1    Mar. 12, 2020

(30) Foreign Application Priority Data

Sep. 11, 2018    (KR) .......................... 10-2018-0108576

(51) Int. Cl.
*G07C 9/00* (2020.01)
*H04L 9/08* (2006.01)

(52) U.S. Cl.
CPC ........ *G07C 9/00309* (2013.01); *H04L 9/0863* (2013.01); *H04L 9/0872* (2013.01); *G07C 2009/00468* (2013.01)

(58) Field of Classification Search
None
See application file for complete search history.

(56) References Cited

U.S. PATENT DOCUMENTS

| | | | | |
|---|---|---|---|---|
| 7,602,274 B2 * | 10/2009 | Lee | .................... | G06K 19/0723 340/10.2 |
| RE41,843 E * | 10/2010 | Blatz | .................. | G06K 19/0723 324/207.17 |
| 9,809,197 B2 * | 11/2017 | Miyazawa | ............... | H04Q 9/00 |
| 2018/0065597 A1 | 3/2018 | Kim et al. | | |
| 2019/0238009 A1 * | 8/2019 | Nakamura | ............. | H02K 1/185 |

FOREIGN PATENT DOCUMENTS

| | | |
|---|---|---|
| EP | 1 719 863 A1 | 11/2006 |
| KR | 10-2005-0012674 | 2/2005 |
| KR | 10-2007-0054115 | 5/2007 |
| KR | 10-2013-0005213 | 1/2013 |
| KR | 10-2016-0110100 | 9/2016 |
| KR | 2017-0010653 A | 2/2017 |

OTHER PUBLICATIONS

WEB Publication corresponding to http://www.hellodd.com/?md=news&mt=view&pid=61612.

* cited by examiner

*Primary Examiner* — K. Wong (74) *Attorney, Agent, or Firm* — Mintz Levin Cohn Ferris Glovsky and Popeo, P.C.; Peter F. Corless

(57) ABSTRACT

A vehicle may include: a first antenna; a first receiver configured to receive a first radio signal through the first antenna, the first radio signal having a first frequency; a transmitter configured to transmit a second radio signal through the first antenna, the second radio signal having a second frequency; and a controller configured to acquire information indicating a current time included in the first radio signal, and to control operation of the transmitter so as to transmit the second radio signal including the information indicating the current time.

19 Claims, 8 Drawing Sheets

VEHICLE, CONTROL METHOD THEREOF, AND TRANSCEIVER FOR VEHICLE

CROSS-REFERENCE TO RELATED APPLICATION

This application is based on and claims priority under 35 U.S.C. § 119 to Korean Patent Application No. 10-2018-0108576, filed on Sep. 11, 2018 in the Korean Intellectual Property Office, the disclosure of which is incorporated herein by reference in its entirety.

BACKGROUND

1. Technical Field

The present disclosure relates to a vehicle, a control method thereof, and a transceiver for the vehicle, and more particularly, to a vehicle, a control method thereof, and a transceiver for the vehicle capable of enhancing security.

2. Discussion of Related Art

Many modern vehicles are equipped with various electronic devices for the purpose of enhancing driver convenience. Among them, a user identification device (UID), e.g., a smart key, is often used to identify the driver. The vehicle can authenticate the driver using the UID, and can restrict vehicle control (e.g., acceleration control, steering control, braking control, etc.) to authenticated drivers.

Conventionally, the vehicle authenticates the UID of the driver with a unique identification code and a sequentially changing rolling code of the UID. However, this type of authentication of the UID is often vulnerable to security issues.

SUMMARY OF THE DISCLOSURE

The present disclosure provides a vehicle, a control method thereof, and a transceiver for the vehicle for the enhancement of security.

The present disclosure also provides a vehicle, a control method thereof, and a transceiver for the vehicle, which authenticates a user identification device using a one-time password (OTP).

The present disclosure also provides a vehicle, a control method thereof, and a transceiver for the vehicle, which creates the OTP based on information indicating a current time included in a broadcast signal.

In accordance with embodiments of the present disclosure, a vehicle may include: a first antenna; a first receiver configured to receive a first radio signal through the first antenna, the first radio signal having a first frequency; a transmitter configured to transmit a second radio signal through the first antenna, the second radio signal having a second frequency; and a controller configured to acquire information indicating a current time included in the first radio signal, and to control operation of the transmitter so as to transmit the second radio signal including the information indicating the current time.

The controller may control operation of the first receiver and the operation of the transmitter, respectively, so as to alternately receive the first radio signal and transmit the second radio signal.

The controller may control the operation of the first receiver so as to receive the first radio signal during a first time in a predetermined period, and to control the operation of the transmitter so as to transmit the second radio signal during a second time in the predetermined period.

The vehicle may further include a second antenna and a second receiver configured to receive a third radio signal through the second antenna, the third radio signal having a third frequency. The controller may acquire a first one-time password included in the third radio signal.

The controller may create a second one-time password based on the information indicating the current time, and control operation of the vehicle according to a control instruction included in the third radio signal when the first one-time password is identical to the second one-time password.

The vehicle may further include a first capacitor and a second capacitor. The first antenna may include a first inductor and a second inductor connected in series, the first capacitor is connected to the first and second inductors, and the second capacitor may be connected to the second inductor.

The first frequency may correspond to a resonance frequency between the first and second inductors and the first capacitor, and the second frequency may correspond to a resonance frequency between the second inductor and the second capacitor.

An input of the first receiver may be connected to the first capacitor and an output of the transmitter may be connected to the second capacitor.

The vehicle may further include a filter disposed between the input of the first receiver and the first capacitor, the filter configured to cut off a radio signal having the second frequency.

The vehicle may further include a switch module configured to selectively connect the second inductor to one of the first inductor and the second capacitor.

Furthermore, in accordance with embodiments of the present disclosure, a control method of a vehicle having a first antenna may include: receiving, through the first antenna, a first radio signal having a first frequency, the first radio signal including information indicating a current time; and transmitting, through the first antenna, a second radio signal having a second frequency, the second radio signal including the information indicating the current time.

Reception of the first radio signal and transmission of the second radio signal may be performed alternately.

The reception of the first radio signal may be performed during a first time in a predetermined period and the transmission of the second radio signal may be performed during a second time in the predetermined period.

The control method may further include receiving a third radio signal having a third frequency; and acquiring a first one-time password included in the third radio signal.

The control method may further include creating a second one-time password based on the information indicating the current time; and controlling operation of the vehicle according to a control instruction included in the third radio signal when the first one-time password is identical to the second one-time password.

Furthermore, in accordance with embodiments of the present disclosure, a transceiver for a vehicle may include: an antenna having a first inductor and a second inductor connected in series; a first capacitor connected to the first and second inductors; a receiver connected to the first capacitor; a second capacitor connected to the second inductor; and a transmitter connected to the second capacitor. The receiver may be configured to receive a first radio signal through the antenna, the first radio signal having a first frequency, and the transmitter may be configured to transmit a second radio signal through the antenna, the second radio signal having a second frequency.

The first frequency may correspond to a resonance frequency between the first and second inductors and the first capacitor, and the second frequency may correspond to a resonance frequency between the second inductor and the second capacitor.

The transceiver for vehicle may further include a filter disposed between the receiver and the first capacitor, the filter configured to cut off a radio signal having the second frequency.

The transceiver for vehicle may further include a switch module configured to selectively connect the second inductor to one of the first inductor and the second capacitor.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may control operation of units, modules, parts, devices, or the like, as described herein. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

The principle and embodiments of the present disclosure will now be described with reference to accompanying drawings.

Figure 1:
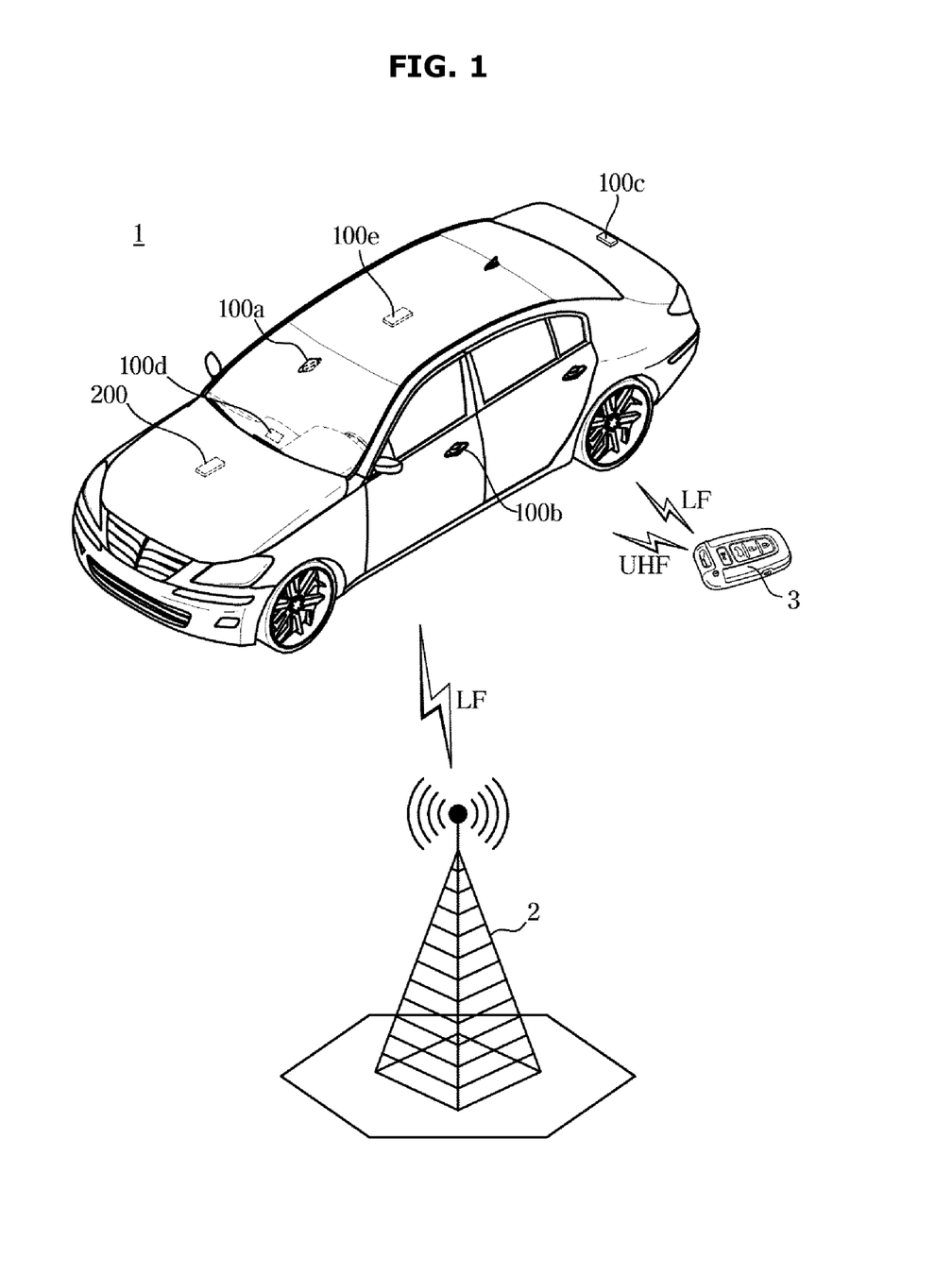
FIG. 1 shows a vehicle, according to an embodiment of the present disclosure.

FIG. 1 shows a vehicle, according to embodiments of the present disclosure.

As shown in FIG. 1, a vehicle 1 may include a car body forming the exterior of the vehicle 1 and accommodating the driver and/or baggage, a chassis including parts of the vehicle 1 other than the car body, and electronic parts for protecting the driver or giving convenience to the driver. The car body may form interior space, in which the driver may stay, an engine room for accommodating an engine, and a trunk room for accommodating baggage. The chassis may include devices for generating power to drive the vehicle 1 and driving/braking/steering the vehicle 1 with the power, under the control of the driver. The electronic parts may control the vehicle 1 and provide safety and convenience for the driver and passengers.

The vehicle 1 may receive radio signals from a base station 2 and communicate with a user identification device 3.

The vehicle 1 may receive a low frequency (LF) signal having a first frequency. The LF signal may refer to a radio signal having a frequency ranging from about 30 KHz to about 300 KHz. For example, the vehicle 1 may receive a radio signal having a frequency of about 65 KHz from the base station 2.

The LF signal received by the vehicle 1 from the base station 2 may include information indicating a current time. The vehicle 1 may correct the current time of the clock of the vehicle 1 based on the LF signal received from the base station 2.

In addition, the LF signal received by the vehicle 1 from the base station 2 may include a disaster broadcast signal. The vehicle 1 may reproduce the disaster broadcast signal included in the LF signal.

The vehicle 1 may exchange radio frequency (RF) signals with the user identification device 3. The RF signals may refer to radio signals having frequencies ranging from about 3 KHz to about 300 GHz.

The user identification device 3 may be a key fob connected to the vehicle 1 via cable or wirelessly to unlock the doors or start the engine to drive the vehicle 100.

The user identification device 3 is not limited to the key fob, but may include any input device that may control the vehicle 1 to unlock the doors and start the engine to drive the vehicle 100. For example, if a mobile device serves as the user identification device 3, the user identification device 3 may include the mobile device. For this, an application to execute operation as the user identification device 3 may be installed in the mobile device, in which case the application may be installed before the mobile device is released or may be downloaded from a server after the mobile device is released. Furthermore, the mobile device may go through an authentication process to operate as the user identification device 3 for the vehicle 1.

The vehicle 1 may exchange RF signals with the user identification device 3 to authenticate the user identification device 3.

The vehicle 1 may transmit an LF signal to the user identification device 3. The vehicle 1 may transmit an LF signal having the first frequency. For example, the vehicle 1 may transmit an LF signal having a frequency of about 125 KHz to the user identification device 3.

In response to the LF signal having the first frequency sent from the vehicle 1, the user identification device 3 may transmit an ultra-high frequency (UHF) signal having a third frequency. The UHF signal may refer to a signal ranging from about 300 MHz to about 3 GHz. The user identification device 3 may transmit the UHF signal of about 433 MHz to the vehicle 1.

The vehicle 1 may receive the UHF signal from the user identification device 3, and based on the received UHF signal, authenticate the user identification device 3.

The vehicle 1 may include a plurality of LF transceivers 100a, 100b, 100c, 100d, and 100e (collectively, 100) for receiving an LF signal from the base station 2 and transmit an LF signal to the user identification device 3, and a UHF receiver 200 for receiving a UHF signal from the user identification device 3.

The UHF receiver 200 may be installed under the dashboard of the vehicle 1, i.e., inside the vehicle 1.

By contrast, the plurality of LF transceivers 100 may be installed in various positions at the vehicle 1. For example, some of the plurality of LF transceivers 100 may be installed on the outer side of the vehicle 1, such as on handles of the left and right doors of the vehicle 1 and on the trunk of the vehicle 1, as shown in FIG. 1, and some others may be installed inside the vehicle 1, such as at the dashboard of the vehicle 1, at an indoor light of the vehicle 1, etc.

Some of the plurality of LF transceivers 100 may receive an LF signal from the base station 2 and transmit an LF signal to the user identification device 3, and some others of the plurality of LF transceivers 100 may only transmit an LF signal to the user identification device 3. For example, the LF transceivers 100a, 100b, and 100c installed on the outer side of the vehicle 1 may receive an LF signal from the base station 2 and transmit an LF signal to the user identification device 3, while the LF transceivers 100d and 100e installed inside the vehicle 1 may only transmit an LF signal to the user identification device 3.

Figure 2:
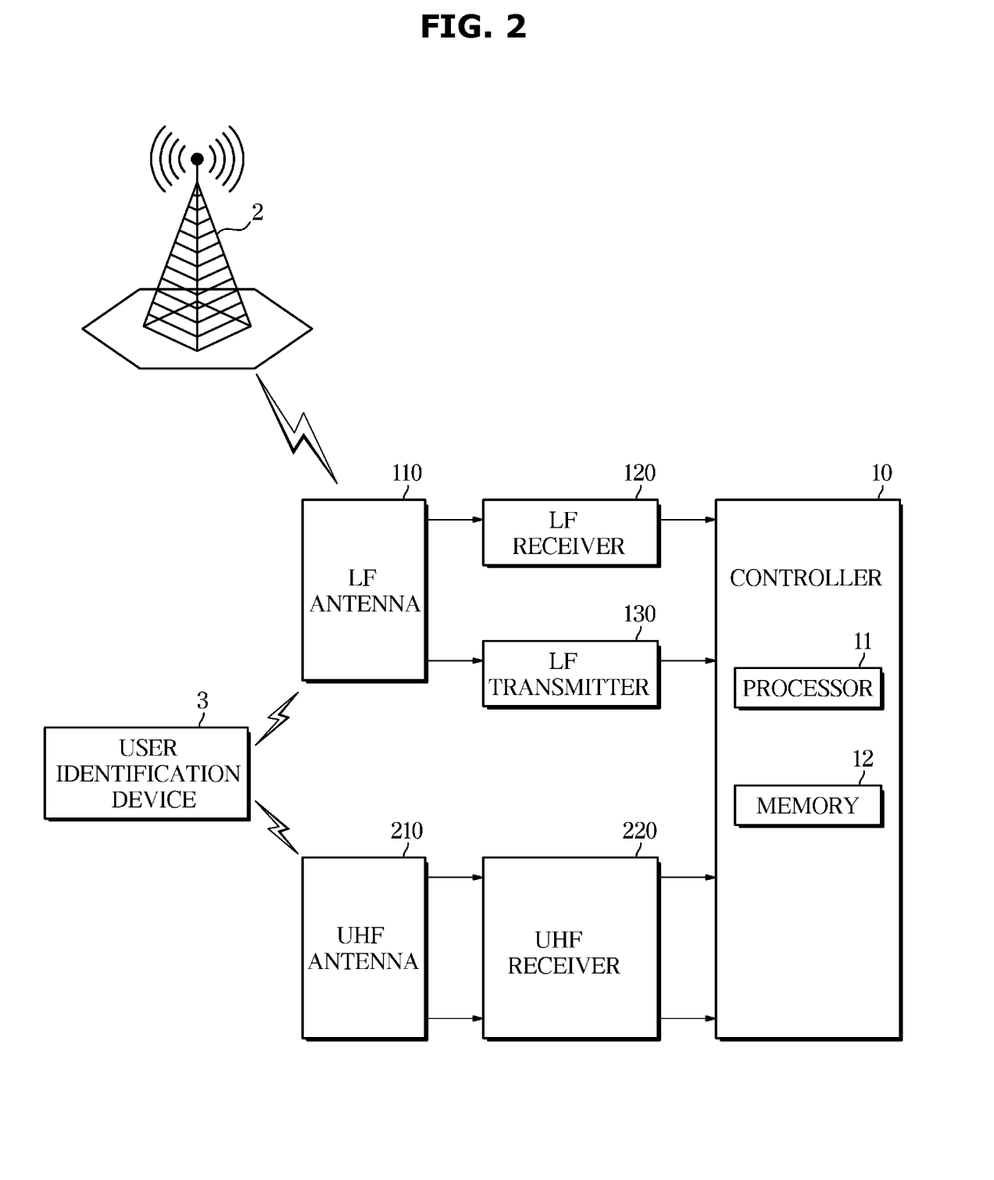
FIG. 2 is a configuration of a vehicle, according to embodiments of the present disclosure.
Figure 3:
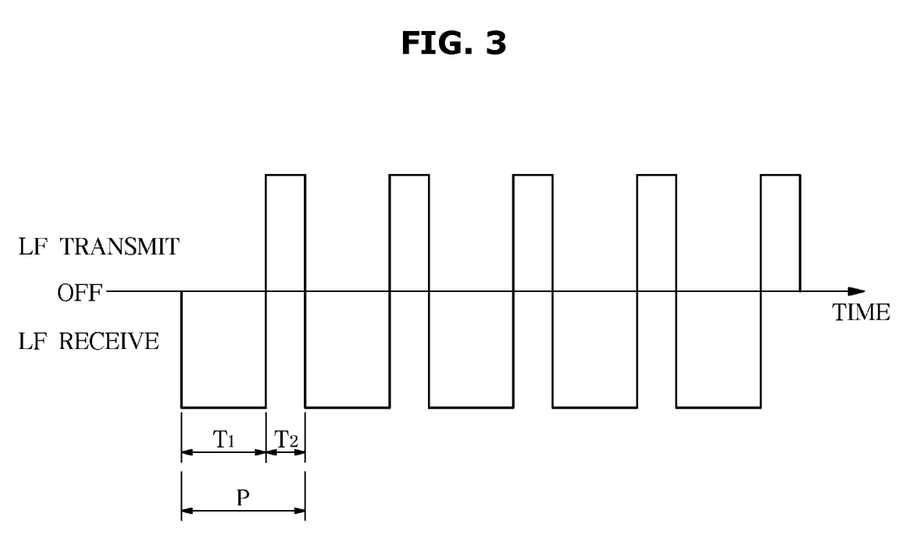
FIG. 3 shows low frequency (LF) signals transmitted and received by a vehicle, according to embodiments of the present disclosure.

FIG. 2 is a configuration of a vehicle, according to embodiments of the present disclosure. FIG. 3 shows LF signals transmitted and received by a vehicle, according to embodiments of the present disclosure.

As shown in FIGS. 2 and 3, the vehicle 1 may include an LF antenna 110, an LF receiver 120, an LF transmitter 130, a UHF antenna 210, a UHF receiver 220, and a controller 10.

The LF antenna 110 may receive an LF signal of a first frequency from the free space and transmit an LF signal of the first frequency to the free space. For example, the LF antenna 110 may receive an LF signal of the first frequency from the base station 2, and forward the received LF signal to the LF receiver 120. The LF antenna 110 may also receive an LF signal from the LF transmitter 130 and transmit the LF signal of a second frequency to the user identification device 3.

The first frequency of the LF signal received by the LF antenna 110 and the second frequency of the LF signal transmitted by the LF antenna 110 may be different from each other. For example, the LF antenna 110 may receive an LF signal of 65 KHz from the base station 2 and transmit an LF signal of 125 KHz to the user identification device 3. As already known in the art, the frequency of a signal to be transmitted or received by the antenna may depend on the figure of the antenna, especially, the length of the antenna. Accordingly, to transmit and receive different frequencies of signals, the LF antenna 110 may have varying length. A specific figure of the LF antenna 110 will be described in detail later.

The LF receiver 120 may process the LF signal received through the LF antenna 110. For example, the LF receiver 120 may extract information included in the LF signal by demodulating the LF signal received through the LF antenna 110. The LF signal may be modulated in various modulation schemes, such as amplitude modulation (AM), frequency modulation (FM), phase modulation (PM), amplitude-shift keying (ASK), frequency-shift keying (FSK), phase-shaft keying (PSK), pulse modulation, etc.

The LF receiver 120 may acquire data included in the LF signal by demodulating the LF signal. For example, the LF receiver 120 may acquire information indicating a current time by demodulating the LF signal and forward the information indicating a current time to the controller 10.

The LF transmitter 130 may create an LF signal by modulating data received from the controller 10, and send the LF signal to the LF antenna 110. For example, to transmit the data to the free space through the LF antenna 110, the LF transmitter 130 may create the LF signal by modulating the data. The LF transmitter 130 may modulate the data in various modulation schemes, such as AM, FM, PM, ASK, FSK, PSK, and pulse modulation, etc.

The data modulated by the LF transmitter 130 may include information indicating a current time. In other words, the LF transmitter 130 may receive the information indicating the current time from the controller 10, and create an LF signal by modulating the information indicating the current time.

The UHF antenna 210 may receive a UHF signal from the free space. For example, the UHF antenna 210 may receive a UHF signal from the user identification device 3 through the free space, and forward the received UHF signal to the UHF receiver 220.

The UHF receiver 220 may process the UHF signal received through the UHF antenna 210. For example, the UHF receiver 220 may extract information included in the UHF signal by demodulating the UHF signal received through the UHF antenna 210. The UHF signal may be modulated in various modulation schemes, such as AM, FM, PM, ASK, FSK, PSK, and pulse modulation, etc.

The UHF receiver 220 may acquire data included in the UHF signal by demodulating the UHF signal. For example, the UHF receiver 220 may acquire identification information and one-time password of the user identification device 3 by demodulating the UHF signal.

As described above, the vehicle 1 may receive the information indicating a current time from the base station 2 and transmit the information indicating the current information to the user identification device 3. The user identification device 3 may create a one-time password based on the information indicating the current time received from the vehicle 1. For example, the user identification device 3 may input the indicating the current time to a pre-stored function, and create a one-time password based on the output of the function. Furthermore, the user identification device 3 may input the information indicating the current time to pre-stored look-up data, and create a one-time password based on a search result of the look-up data.

The user identification device 3 may create a UHF signal by modulating the one-time password, and transmit the UHF signal to the vehicle 1.

The UHF receiver 220 may forward the one-time password acquired from the UHF signal to the controller 10.

The controller 10 may send and receive LF signals in every predetermined period P. In other words, the controller 10 may control the LF receiver 120 and the LF transmitter 130 to alternately perform reception and transmission of LF signals during the predetermined period P. Furthermore, the controller 10 may control the LF receiver 120 and the LF transmitter 130 to avoid time-overlap between reception and transmission of the LF signals.

For example, the controller 10 may control the LF receiver 120 to receive an LF signal from the base station 2 during first time T1 in a predetermined period, and control the LF transmitter 130 to transmit an LF signal to the user identification device 3 during second time T2 in the predetermined period. The controller 10 may repeat reception of the LF signal during the first time T1 and transmission of the LF signal during the second time T2.

The controller 10 may send an activation signal to the LF receiver 120 in the every predetermined period P, and the LF receiver 120 may receive an LF signal during the first time in response to the activation signal from the controller 10. The controller 10 may receive information indicating a current time from the LF receiver 120, which receives the information during the first time.

The controller 10 may create a one-time password based on the information indicating a current time. For example, the controller 10 may input the information indicating the current time to a pre-stored function, and create a one-time password based on the output of the function. Furthermore, the controller 10 may input the information indicating the current time to pre-stored look-up data, and create a one-time password based on a search result of the look-up data.

The controller 10 may send an activation signal to the LF transmitter 130 in the every predetermined period P, and the LF transmitter 130 may transmit an LF signal during the second time in response to the activation signal from the controller 10. Furthermore, the LF transmitter 130 may transmit the information indicating a current time to the user identification device 3 during the second time.

As described above, the user identification device 3 may create one-time password based on the information indicating the current time received from the LF transmitter 130, and create a UHF signal by modulating the one-time password. The user identification device 3 may transmit the UHF signal to the vehicle 1, and the UHF receiver 220 may receive the UHF signal through the UHF antenna 210 and acquire the one-time password by demodulating the UHF signal.

The controller 10 may receive the one-time password demodulated from the UHF signal from the UHF receiver 220.

The controller 10 may compare the one-time password received from the UHF receiver 220 (hereinafter, called "first one-time password") with the one-time password created by the controller 10 (hereinafter, called "second one-time password"), and determine whether the first one-time password is identical to the second one-time password.

If the first one-time password is identical to the second one-time password, the controller 10 may authenticate the user identification device 3, unlock the doors under the control of the user identification device 3, and start the vehicle 1 at a start command from the driver.

If the first one-time password is different from the second one-time password, the controller 10 may not authenticate the user identification device 3 nor process the signal from the user identification device 3.

The controller 10 may include a memory 12 for storing control programs and data to control the operation of the vehicle 1, and a processor 11 for processing the data according to the control program stored in the memory 12.

The memory 12 may store control programs to control the LF receiver 120, LF transmitter 130, and UHF receiver 220, and functions/look-up tables for creating a one-time password from the current time.

The memory 12 may temporarily store data received from the LF receiver 120 and UHF receiver 220, and provide the data to the processor 11 according to an instruction of the processor 11. Furthermore, the memory 12 may temporarily store data created by the processor 11 until the data is sent to the LF transmitter 130.

The memory 12 may include a non-volatile memory, such as a Read Only Memory (ROM), a flash memory, and/or the like, which may store data for a long period, and a volatile memory, such as a static random access memory (SRAM), a dynamic RAM (DRAM), or the like, which may temporarily store data.

The processor 11 may process the data stored in the memory 12 according to a program (a series of instructions) stored in the memory 12, and provide the resultant data of the process back to the memory 12.

The processor 11 may alternately create the activation signal to activate the LF receiver 120 and the activation signal to activate the LF transmitter 130 in the every predetermined period P.

The processor 11 may create the second one-time password from the information indicating a current time received from the LF receiver 120. The processor 11 may compare the first one-time password received from the UHF receiver 220 with the second one-time password. If the first one-time password is identical to the second one-time password, the processor 11 may create a signal to unlock the doors of the vehicle 1 and/or a signal to start the vehicle 1.

The processor 11 may include an operation circuit for performing logic operation and arithmetic operation, and a memory circuit for storing the data resulting from the operation.

Figure 4:
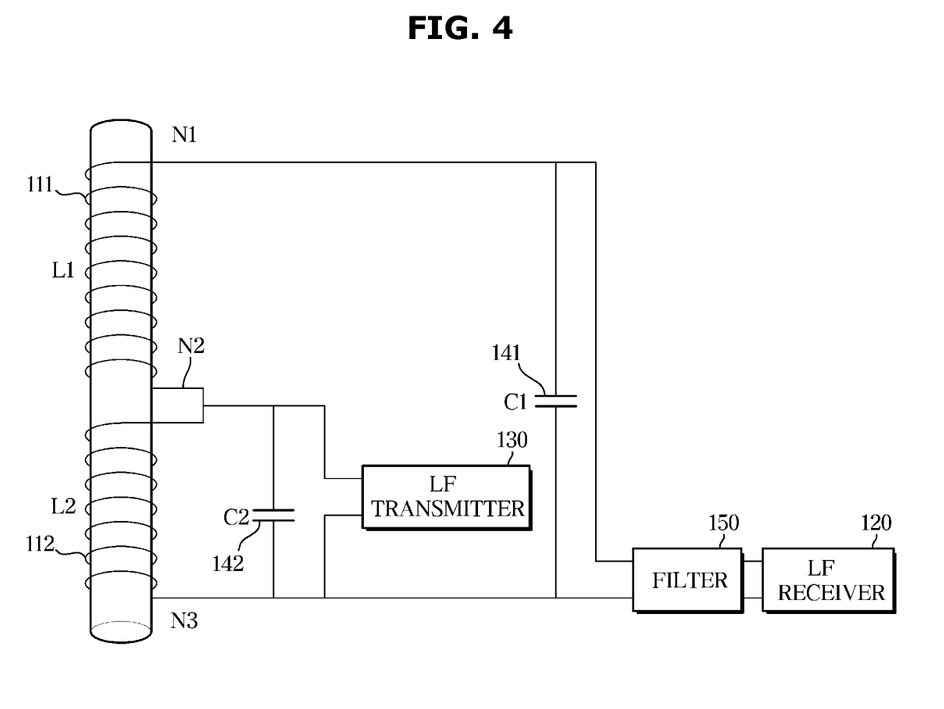
FIG. 4 is a block diagram of an LF transceiver included in a vehicle, according to embodiments of the present disclosure.

FIG. 4 is a block diagram of an LF transceiver included in a vehicle, according to embodiments of the present disclosure.

The vehicle 1 may include the plurality of LF transceivers 100. The plurality of LF transceivers 100 may each include the LF antenna 110, a first capacitor 141, the LF transmitter 130, a second capacitor 142, a filter 150, and the LF receiver 120, as shown in FIG. 4.

The LF antenna 110 may include a first inductor 111 and a second inductor 112, which are separable from each other and connected in series. The LF antenna 110 may include a first terminal N1, a second terminal N2, and a third terminal N3. The first inductor 111 is arranged between the first and second terminals N1 and N2, and the second inductor 112 is arranged between the second and third terminals N2 and N3. The first and second inductors 111 and 112 may join at the second terminal N2.

The first and second inductors 111 and 112 may each produce an electromagnetic field in response to an alternate current (AC) signal. For example, the first and second inductors 111 and 112 may each receive an LF signal and radiate an electromagnetic field having an LF frequency into the free space. The first and second inductors 111 and 112 may each receive an electromagnetic field of the LF frequency from the free space and create an LF signal in response to the received electromagnetic field.

The first inductor 111 may have first inductance L1, and the second inductor 112 may have second inductance L2.

The first capacitor 141 may be arranged between the first and third terminals N1 and N3 of the LF antenna 110. One end of the first capacitor 141 may be connected to the first terminal N1 of the LF antenna 110, and the other end of the first capacitor 141 may be connected to the third terminal N3 of the LF antenna 110.

The first capacitor 141 may have first capacitance C1.

The first capacitor 141 may be resonated with the first and second inductors 111 and 112 arranged between the first and third terminals N1 and N3. First resonance frequency f1 between the first capacitor 141 and the first and second inductors 111 and 112 may be defined as in the following equation (1):

$$f_1 = \frac{1}{2\pi\sqrt{(L_1+L_2)C_1}} \quad (1)$$

where, f1 denotes the resonance frequency of the first capacitor 141 and the first and second inductors 111 and 112, π denotes the circular constant, L1 denotes inductance of the first inductor 111, L2 denotes inductance of the second inductor 112, and C1 denotes capacitance of the first capacitor 141.

In a case that the LF antenna 110 transmits an LF signal having the frequency of about 65 KHz, the first resonance frequency f1 may be approximately 65 KHz.

The second capacitor 142 may be arranged between the second and third terminals N2 and N3 of the LF antenna 110. One end of the second capacitor 142 may be connected to the second terminal N2 of the LF antenna 110, and the other end of the second capacitor 142 may be connected to the third terminal N3 of the LF antenna 110.

The second capacitor 142 may have second capacitance C2.

The second capacitor 142 may be resonated with the second inductor 112. Second resonance frequency f2 between the second capacitor 142 and the second inductor 112 may be defined as in the following equation (2):

$$f_2 = \frac{1}{2\pi\sqrt{L_2C_2}} \quad (2)$$

where, f2 denotes the resonance frequency of the second capacitor 142 and the second inductor 112, 7E denotes the circular constant, L2 denotes inductance of the second inductor 112, and C2 denotes capacitance of the second capacitor 142.

In a case that the LF antenna 110 receives an LF signal having the frequency of about 125 KHz, the second resonance frequency f2 may be approximately 125 KHz.

The filter 150 may be connected to both ends of the first capacitor 141 and connected to the LF receiver 120. Specifically, input ends of the filter 150 may be connected to both ends of the first capacitor 141 and output ends of the filter 150 may be connected to input ends of the LF receiver 120.

The filter 150 may cut off the LF signal of the first resonance frequency f1 output from the LF transmitter 130. For example, the filter 150 may include a band pass filter (BPF) that passes LF signals having the second resonance frequency f2. The filter 150 may also include a low pass filter (LPF) that passes LF signals having the second resonance frequency f2 but cuts off LF signals having the first resonance frequency f1.

The LF receiver 120 may be connected to the resonant circuit including the first capacitor 141 and the first and second inductors 111 and 112 via the filter 150. Specifically, the input ends of the LF receiver 120 may be connected to both ends of the first capacitor 141 via the filter 150.

The LF receiver 120 may receive an LF signal having the first resonance frequency f1 from the first capacitor 141 under the control of the controller 10. The first capacitor 141 and the first and second inductors 111 and 112 may acquire electromagnetic waves of the first resonance frequency f1 from the free space, and the LF receiver 120 may receive an LF signal of the first resonance frequency f1 from the first capacitor 141.

The LF transmitter 130 may be connected to the resonant circuit including the second capacitor 142 and the second inductor 112. Specifically, the output ends of the LF transmitter 130 may be connected to both ends of the second capacitor 142.

The LF transmitter 130 may provide an LF signal having the second resonance frequency f2 to the second capacitor 142 under the control of the controller 10. The second capacitor 142 and the second inductor 112 are resonated according to the LF signal having the second resonance frequency f2 output from the LF transmitter 130, and electromagnetic waves of the first resonance frequency f1 may be radiated into the free space from the second inductor 112.

Figure 5:
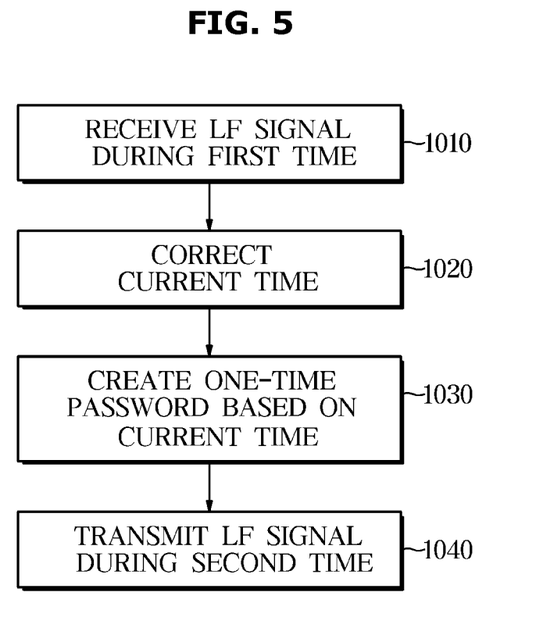
FIG. 5 is a flowchart illustrating a first control method of a vehicle, according to embodiments of the present disclosure.

FIG. 5 is a flowchart illustrating a first control method of a vehicle, according to embodiments of the present disclosure.

As shown in FIG. 5, the vehicle 1 receives an LF signal during the first time, in 1010.

The controller 10 of the vehicle 1 may control the LF receiver 120 to receive an LF signal from the base station 2 during the first time T1 in a predetermined period. The LF receiver 120 may receive an LF signal having the first resonance frequency f1 from the LF antenna 110 under the control of the controller 10, and output the LF signal of the first resonance frequency f1 to the controller 10.

The LF signal received from the base station 2 may include information indicating a current time.

The vehicle 1 corrects current time based on the information indicating the current time, in 1020.

The controller 10 may store the current time indicating present time, and compare the current time with the information indicating the current time included in the LF signal. If the current time is different from the information indicating the current time, the controller 10 may correct the current time based on the information indicating the current time.

The vehicle 1 creates the second one-time password, in 1030.

The controller 10 may create the second one-time password based on the corrected current time. For example, the controller 10 may input the information indicating the current time to a pre-stored function, and create the second one-time password based on the output of the function. Furthermore, the controller 10 may input the information indicating the current time to pre-stored look-up data, and create the second one-time password based on a search result of the look-up data.

The vehicle 1 transmits an LF signal during the second time, in 1040.

The controller 10 may control the LF transmitter 130 to transmit the LF signal to the user identification device 3 during the second time T2 in the predetermined period. The LF transmitter 130 may send the LF signal having the second resonance frequency f2 to the LF antenna 110 under the control of the controller 10, and the LF antenna 110 may emit the LF signal of the second resonance frequency f2 to the free space.

The LF signal transmitted to the user identification device 3 may include information indicating the current time.

Figure 6:
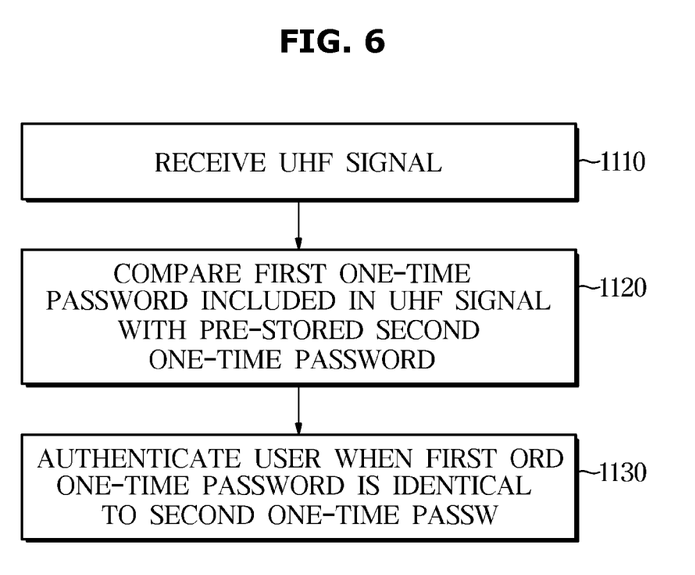
FIG. 6 is a flowchart illustrating a second control method of a vehicle, according to embodiments of the present disclosure.

FIG. 6 is a flowchart illustrating a second control method of a vehicle, according to embodiments of the present disclosure.

As shown in FIG. 6, the vehicle 1 receives a UHF signal, in 1110.

The controller 10 of the vehicle 1 may receive the UHF signal from the user identification device 3 through the UHF antenna 210 and UHF receiver 220.

The UHF signal may include identification information and first one-time password of the user identification device 3. The user identification device 3 may create the first one-time password based on the information indicating a current time included in the LF signal received from the vehicle 1. The user identification device 3 may create a UHF signal by modulating the one-time password, and transmit the UHF signal to the vehicle 1.

The vehicle 1 compares the first one-time password included in the UHF signal and the second one-time password created in advance, in 1120.

The controller 10 may create the second one-time password based on the information indicating the current time received from the LF receiver 120, and acquire the first one-time password of the user identification device 3 from the UHF receiver 220.

The controller 10 may compare the first one-time password of the user identification device 3 with the second one-time password.

If the first one-time password is identical to the second one-time password, the controller 10 authenticates the user of the user identification device 3, in 1130.

If the first one-time password is identical to the second one-time password, the controller 10 may authenticate the user identification device 3, unlock the doors under the control of the user identification device 3, and start the vehicle 1 at a start command from the driver.

Figure 7:
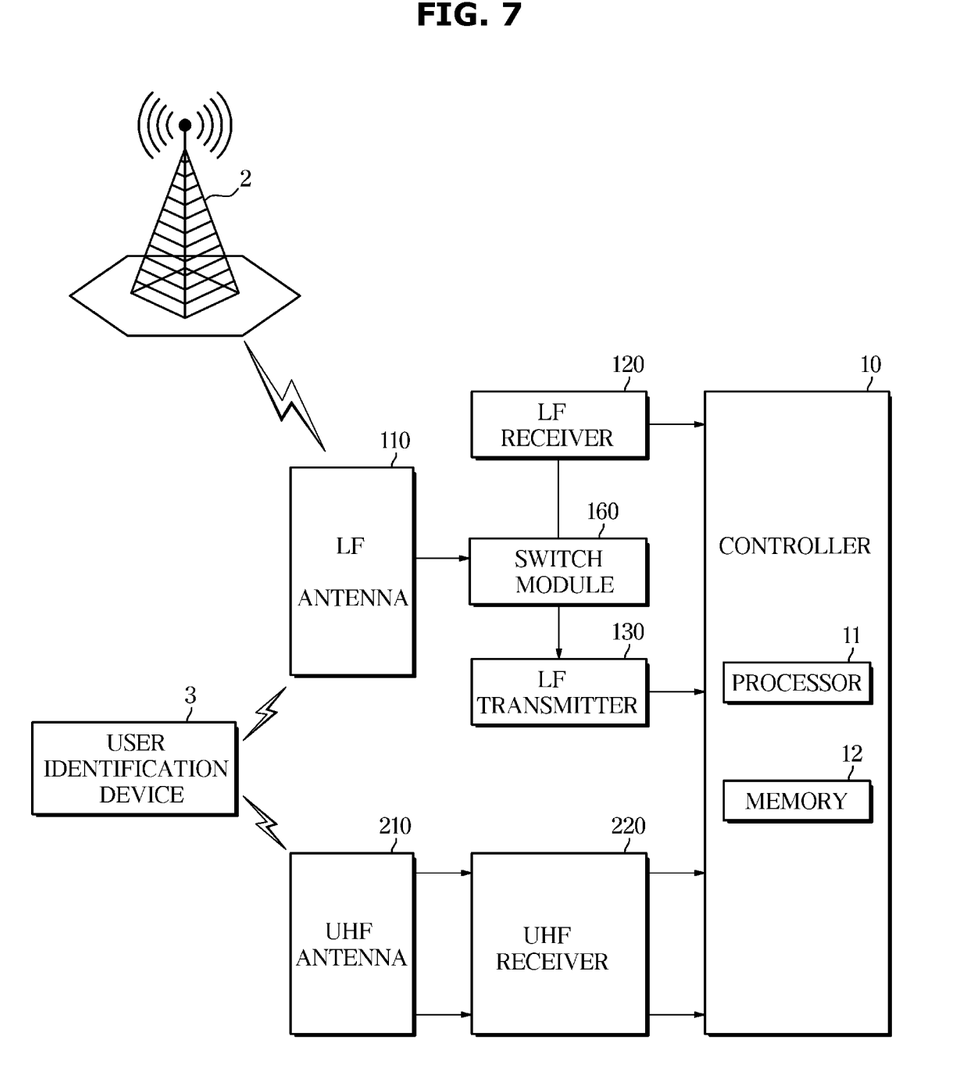
FIG. 7 is another configuration of a vehicle, according to embodiments of the present disclosure.

FIG. 7 is another configuration of a vehicle, according to embodiments of the present disclosure.

The vehicle 1 may include the LF antenna 110, the LF receiver 120, the LF transmitter 130, the UHF antenna 210, the UHF receiver 220, the controller 10, and a switch module 160.

The LF antenna 110, LF receiver 120, LF transmitter 130, UHF antenna 210, and UHF receiver 220 may be the same as those shown in FIG. 2.

The switch module 160 may connect the LF antenna 110 selectively to one of the LF receiver 120 and the LF transmitter 130, under the control of the controller 10. For example, the switch module 160 may connect the LF antenna 110 to the LF receiver 120 to receive an LF signal from the base station 2 during the first time T1 in the predetermined period. The switch module 160 may connect the LF antenna 110 to the LF transmitter 130 to transmit an LF signal to the user identification device 3 during the second time T2 in the predetermined period.

The switch module 160 may include at least one switching device, e.g., a Metal Oxide Semiconductor Field Effect transistor (MOSFET), a Bipolar Junction Transistor (BJT), etc.

The controller 10 may control the switch module 160 for the LF receiver 120 to receive an LF signal from the base station 2 during the first time T1 in a predetermined period, and control the switch module 160 for the LF transmitter to transmit an LF signal to the user identification device 3 during the second time T2 in the predetermined period.

Figure 8:
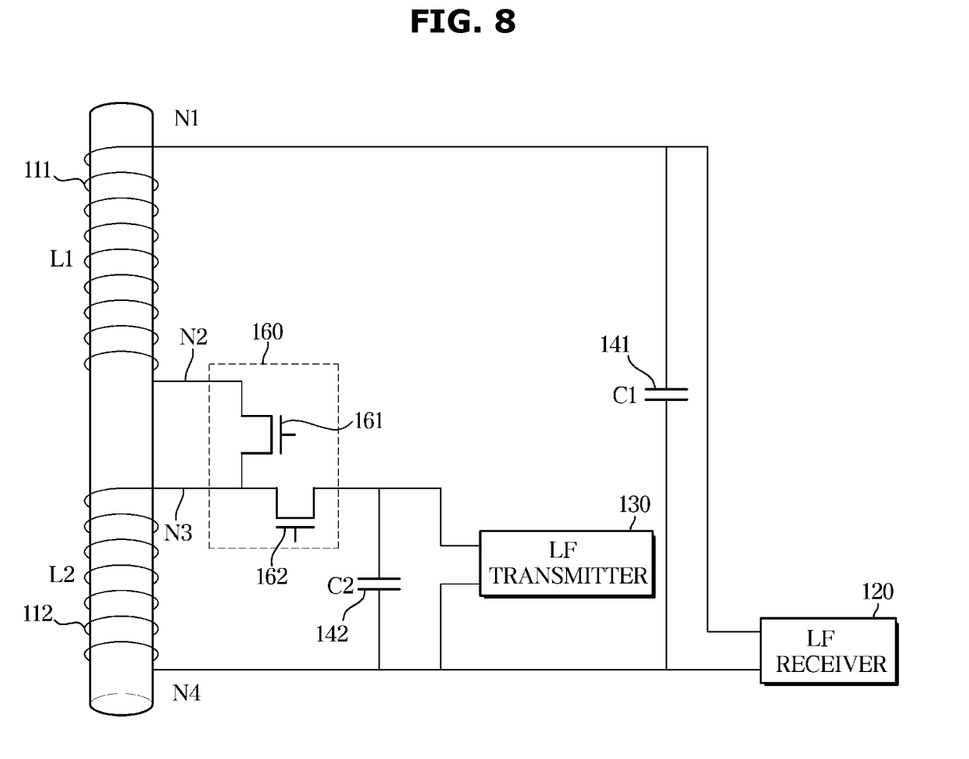
FIG. 8 is another block diagram of an LF transceiver included in a vehicle, according to embodiments of the present disclosure.

FIG. 8 is another block diagram of an LF transceiver included in a vehicle, according to embodiments of the present disclosure.

The vehicle 1 may include the plurality of LF transceivers 100. The plurality of LF transceivers 100 may each include the LF antenna 110, the switch module 160, the first capacitor 141, the LF transmitter 130, the second capacitor 142, and the LF receiver 120, as shown in FIG. 8.

The LF antenna 110 may include the first inductor 111 and the second inductor 112, which are separable from each other and connected in series. The LF antenna 110 may include the first terminal N1, the second terminal N2, the third terminal N3, and a fourth terminal. The first inductor 111 is arranged between the first and second terminals N1 and N2, and the second inductor 112 is arranged between the third and fourth terminals N3 and N4.

Functions of the first and second inductors 111 and 112 may be the same as those of the first and second inductors shown in FIG. 4. The first inductor 111 may have first inductance L1, and the second inductor 112 may have second inductance L2.

The first capacitor 141 may be arranged between the first and fourth terminals N1 and N4 of the LF antenna 110. One end of the first capacitor 141 may be connected to the first terminal N1 of the LF antenna 110, and the other end of the first capacitor 141 may be connected to the fourth terminal N4 of the LF antenna 110.

The first capacitor 141 may have first capacitance C1. The first capacitor 141 may be resonated with the first and second inductors 111 and 112 arranged between the first and fourth terminals N1 and N4.

The second capacitor 142 may be arranged between the fourth terminal N4 of the LF antenna 110 and the switch module 160. One end of the second capacitor 142 may be connected to the fourth terminal N4 of the LF antenna 110, and the other end of the second capacitor 142 may be connected to the switch module 160.

The second capacitor 142 may have second capacitance C2. The second capacitor 142 may be resonated with the second inductor 112 according to an operation of the switch module 160.

As compared to the LF transceiver shown in FIG. 4, the LF transceiver shown in FIG. 8 may not include a filter.

The LF receiver 120 may be connected to the resonant circuit including the first capacitor 141 and the first and second inductors 111 and 112. Specifically, the input ends of the LF receiver 120 may be connected to both ends of the first capacitor 141.

The function of the LF receiver 120 may be the same as that of the LF receiver shown in FIG. 4.

The LF transmitter 130 may be connected to the resonant circuit including the second capacitor 142 and the second inductor 112. Specifically, the output ends of the LF transmitter 130 may be connected to both ends of the second capacitor 142.

The function of the LF transmitter 130 may be the same as that of the LF transmitter shown in FIG. 4.

The switch module 160 may be provided between the first inductor 111, the second inductor 112, and the second capacitor 142. The switch module 160 may allow connection between the first and second inductors 111 and 112 while disconnecting the second inductor 112 from the second capacitor 142, according to a control signal from the controller 10. Furthermore, the switch module 160 may disconnect the first inductor 111 from the second inductor 112 while allowing connection between the second inductor 112 and the second capacitor 142, according to a control signal from the controller 10.

For example, the switch module 160 may include a first switch 161 arranged between the second and third terminals N2 and N3 of the LF antenna 110, and a second switch 162 arranged between the third terminal N3 of the LF antenna 110 and the second capacitor 142.

When the first switch 161 is turned on (closed), the second inductor 112 may be connected to the first inductor 111, and when the second switch 162 is turned on (closed), the second inductor 112 may be connected to the second capacitor 142.

When the first switch 161 is turned on (closed) and the second switch 162 is turned off (opened), the second inductor 112 may be connected to the first inductor 111 and the second inductor 112 may be disconnected from the second capacitor 142. Accordingly, while the first capacitor 141 is resonated with the first and second inductors 111 and 112, the resonance signal is protected from distortion by the second capacitor 142.

When the first switch 161 is turned off (opened) and the second switch 162 is turned on (closed), the second inductor 112 may be disconnected from the first inductor 111 and the second inductor 112 may be connected to the second capacitor 142. Accordingly, while the second capacitor 142 is resonated with the second inductor 112, the resonance signal is not input to the LF receiver 120.

As described above, the vehicle 1 including the LF transceiver 100 may receive an LF signal having the first frequency from the base station 2 through the LF transceiver 100 and transmit an LF signal having the second frequency to the user identification device 3 through the LF transceiver 100.

The LF signal having the first frequency and the LF signal having the second frequency may each have information indicating a current time, and the vehicle 1 may create an one-time password based on the information indicating the current time and compare the one-time password with a one-time password received from the user identification device 3 to authenticate the user identification device 3.

According to embodiments of the present disclosure, a vehicle, a control method thereof, and a transceiver for the vehicle capable of enhancing security may be provided.

According to embodiments of the present disclosure, a vehicle, a control method thereof, and a transceiver for the vehicle which authenticates a user identification device using a one-time password may be provided.

According to embodiments of the present disclosure, a vehicle, a control method thereof, and a transceiver for the vehicle which creates a one-time password based on information indicating a current time included in a broadcast signal may be provided.

Several embodiments have been described above, but a person of ordinary skill in the art will understand and appreciate that various modifications can be made without departing the scope of the present disclosure. Thus, it will be apparent to those ordinary skilled in the art that the true scope of technical protection is only defined by the following claims.

What is claimed is:

1. A vehicle comprising:
a first antenna;
a first receiver configured to receive a first radio signal through the first antenna, the first radio signal having a first frequency;
a transmitter configured to transmit a second radio signal through the first antenna, the second radio signal having a second frequency; and
a controller configured to acquire information indicating a current time included in the first radio signal, and to control operation of the transmitter so as to transmit the second radio signal including the information indicating the current time,
wherein the first frequency and the second frequency are low frequencies.

2. The vehicle of claim 1, wherein the controller is configured to control operation of the first receiver and the operation of the transmitter, respectively, so as to alternately receive the first radio signal and transmit the second radio signal.

3. The vehicle of claim 2, wherein the controller is configured to control the operation of the first receiver so as to receive the first radio signal during a first time in a predetermined period, and to control the operation of the transmitter so as to transmit the second radio signal during a second time in the predetermined period.

4. The vehicle of claim 1, further comprising:
a second antenna; and
a second receiver configured to receive a third radio signal through the second antenna, the third radio signal having a third frequency, wherein the controller is configured to acquire a first one-time password included in the third radio signal.

5. The vehicle of claim 4, wherein the controller is configured to create a second one-time password based on the information indicating the current time, and to control operation of the vehicle according to a control instruction included in the third radio signal when the first one-time password is identical to the second one-time password.

6. The vehicle of claim 1, further comprising:
a first capacitor; and
a second capacitor,
wherein the first antenna includes a first inductor and a second inductor connected in series, the first capacitor is connected to the first and second inductors, and the second capacitor is connected to the second inductor.

7. The vehicle of claim 6, wherein the first frequency corresponds to a resonance frequency between the first and second inductors and the first capacitor, and the second frequency corresponds to a resonance frequency between the second inductor and the second capacitor.

8. The vehicle of claim 6, wherein an input of the first receiver is connected to the first capacitor, and an output of the transmitter is connected to the second capacitor.

9. The vehicle of claim 7, further comprising: a filter disposed between the input of the first receiver and the first capacitor, the filter configured to cut off a radio signal having the second frequency.

10. The vehicle of claim 7, further comprising: a switch module configured to selectively connect the second inductor to one of the first inductor and the second capacitor.

11. A control method of a vehicle including a first antenna, the control method comprising:
receiving, through the first antenna, a first radio signal having a first frequency, the first radio signal including information indicating a current time; and
transmitting, through the first antenna, a second radio signal having a second frequency, the second radio signal including the information indicating the current time.

12. The control method of claim 11, wherein the reception of the first radio signal and the transmission of the second radio signal are performed alternately.

13. The control method of claim 12, wherein the reception of the first radio signal is performed during a first time in a predetermined period, and the transmission of the second radio signal is performed during a second time in the predetermined period.

14. The control method of claim 11, further comprising:
receiving a third radio signal having a third frequency; and
acquiring a first one-time password included in the third radio signal.

15. The control method of claim 14, further comprising:
creating a second one-time password based on the information indicating the current time; and
controlling operation of the vehicle according to a control instruction included in the third radio signal when the first one-time password is identical to the second one-time password.

16. A transceiver for a vehicle comprising:
an antenna including a first inductor and a second inductor connected in series;
a first capacitor connected to the first and second inductors;
a receiver connected to the first capacitor;
a second capacitor connected to the second inductor; and
a transmitter connected to the second capacitor, wherein
the receiver is configured to receive a first radio signal through the antenna, the first radio signal having a first frequency, and
the transmitter is configured to transmit a second radio signal through the antenna, the second radio signal having a second frequency,
wherein the first frequency and the second frequency are low frequencies.

17. The transceiver for vehicle of claim 16, wherein the first frequency corresponds to a resonance frequency between the first and second inductors and the first capacitor, and the second frequency corresponds to a resonance frequency between the second inductor and the second capacitor.

18. The transceiver for vehicle of claim 16, further comprising: a filter disposed between the receiver and the first capacitor, the filter configured to cut off a radio signal having the second frequency.

19. The transceiver for vehicle of claim 16, further comprising: a switch module configured to selectively connect the second inductor to one of the first inductor and the second capacitor.

* * * * *